(12) United States Patent
Bruce

(10) Patent No.: US 8,145,844 B2
(45) Date of Patent: Mar. 27, 2012

(54) MEMORY CONTROLLER WITH WRITE DATA CACHE AND READ DATA CACHE

(75) Inventor: Alistair Crone Bruce, Stockport (GB)

(73) Assignee: ARM Limited, Cambridge (GB)

( * ) Notice: Subject to any disclaimer, the term of this patent is extended or adjusted under 35 U.S.C. 154(b) by 552 days.

(21) Appl. No.: 12/000,572

(22) Filed: Dec. 13, 2007

(65) Prior Publication Data

US 2009/0157980 A1  Jun. 18, 2009

(51) Int. Cl.
*G06F 13/00* (2006.01)
(52) U.S. Cl. .................. 711/120; 711/141; 711/E12.026
(58) Field of Classification Search .................. None
See application file for complete search history.

(56) References Cited

U.S. PATENT DOCUMENTS

| | | | |
|---|---|---|---|
| 5,636,355 A * | 6/1997 | Ramakrishnan et al. ..... | 711/113 |
| 6,275,908 B1 * | 8/2001 | Arimilli et al. ............... | 711/146 |
| 6,292,872 B1 * | 9/2001 | Arimilli et al. ............... | 711/146 |
| 6,681,292 B2 * | 1/2004 | Creta et al. .................... | 711/119 |
| 7,020,751 B2 | 3/2006 | Kershaw | |
| 7,213,095 B2 | 5/2007 | Middleton et al. | |
| 2003/0023817 A1 * | 1/2003 | Rowlands et al. ............ | 711/141 |
| 2003/0041212 A1 * | 2/2003 | Creta et al. .................... | 711/118 |
| 2004/0143712 A1 * | 7/2004 | Armstrong et al. ........... | 711/152 |
| 2005/0050281 A1 * | 3/2005 | Snyder et al. ................. | 711/144 |
| 2006/0036828 A1 * | 2/2006 | Jeddeloh ........................ | 711/167 |
| 2007/0186053 A1 * | 8/2007 | Chaudhry et al. ............ | 711/141 |

OTHER PUBLICATIONS

Rixner, Scott et al.; "Memory Access Scheduling", Appears in ISCA-27, pp. 1-11, (2000).
Kroft, David, "Lockup-Free Instruction Fetch/Prefetch Cache Organization", IEEE, pp. 195-201, (1981).

* cited by examiner

*Primary Examiner* — Edward Dudek, Jr.
*Assistant Examiner* — Sean D Rossiter
(74) *Attorney, Agent, or Firm* — Nixon & Vanderhye P.C.

(57) ABSTRACT

A memory controller includes a write data cache, a read data cache and coherency circuitry. The coherency circuitry manages coherency of data between the write data cache, the read data cache and data stored within a main memory when servicing read requests and write requests received by the memory controller. Write complete signals are issued back to a write requesting circuit as soon as a write request has had its write data stored within the write data cache.

19 Claims, 8 Drawing Sheets

Write Data Cache

Read Data Cache

MEMORY CONTROLLER WITH WRITE DATA CACHE AND READ DATA CACHE

TECHNICAL FIELD

This invention relates to the field of memory controllers.

BACKGROUND

It is known to provide memory controllers which serve the function of generating appropriate signals to perform data accesses (both reads and writes) to memory taking into account the requirements for control signals, setup, timing and other matters required by the memory concerned.

Typical design requirements for memory controllers are the ability to cope with different memory types, the ability to drive periodic refresh, the ability to deal with clock domain crossing and, bus width conversion and to exploit the provision of open pages and access reordering which are possible with some memory configurations in order to increase throughput and/or meet quality-of-service requirements.

It is also known within integrated circuit design to produce so called system-on-chip integrated circuits in which different functional blocks are joined together by interconnect structures, such as the AXI compliant interconnects produced by ARM Limited of Cambridge, England. One problem which can arise in this context are data hazards such as read-after-write hazards which can be introduced by the reordering of data accesses permitted by interconnect structures. Reordering is desirable in order to improve throughput, but gives rise to complication in avoiding hazards. One way to avoid hazards is to delay returning a write response for a write access until after the data has actually been written to memory such that a subsequent read access will not be attempted until after the write has actually been made. However, this approach has the result that the write accesses incur the full memory latency penalty. If a write response is returned before the write is made (i.e. with the write being buffered), then it is necessary to have some hazard detection logic that records such dependencies and ensures that a read access to the same address as a pending write does get the correct data. U.S. Pat. No. 7,213,095 describes one example of such hazard detection logic. Dependent accesses (commands) with such a system are held until the commands upon which they are dependent have completed.

The interface between a memory controller and a memory can often represent a significant bottleneck in the performance of a data processing system. It is common for memories to be provided off-chip and this can result in an increase in the energy required to make memory accesses and the latency associated with such memory accesses.

It is also known to provide write buffers which are able to merge write requests into longer requests which can be made more efficiently to an attached memory device.

U.S. Pat. No. 7,020,751 describes various techniques for write back control of a cache memory that seek to improve speed and/or efficiency.

SUMMARY

Viewed from one aspect the technology described herein provides a memory controller comprising:
a write data cache having a, plurality of write cache lines respectively storing write data to be written to a memory;
a read data cache separate from said write data cache and having a plurality of read cache lines respectively storing read data read from said memory; and
coherency circuitry coupled to said write data cache and said read data cache and responsive to access requests to said memory to manage coherency between said write data, said read data and data stored within said memory.

The separate provision of a write data cache and a read data cache within the memory controller in combination with coherency circuitry for managing coherence between the write data and the read data held within the respective caches and the data stored within the memory enables, an advantageous increase in throughput, provides a good degree of separation between the system side and the memory side of the memory controller, provides a flexible architecture supporting a wide range of memory systems and permits the reordering of access requests in a way which facilitates improved performance and reduces processing bottlenecks.

In some embodiments the coherency circuitry can use the data stored within the read data cache and the write data cache to provide the effect of giving access to the memory when it is in a plurality of different states, e.g. different states each corresponding to the state following a corresponding one of a sequence of write operations. Such behaviour is not possible with a standard cache memory which normally has as an important design objective providing a unified and consistent view of a main memory at one point in time so that coherency issues can be avoided.

As one example, in some embodiments the relative temporal ordering of a plurality of write access requests can be used by the coherency circuitry so that a read request will be serviced with any relevant portions of temporarily preceding write accesses held within the write data cache, but will not include any corresponding portions of temporally succeeding write accesses. Each of the buffered write accesses within the write data cache represents a different state of the memory system and a read access can be serviced so as to take account of the temporal position of the read access relative to the sequence of write accesses.

In some embodiments the coherency circuitry operates in response to a read request to identify any portions of the target data for that read request which are currently stored within the write data cache and then to forward a read request to the read data cache corresponding to portions of the target data which are not currently held within the write data cache as pending writes. The coherency circuitry may then serve to return respective portions of the target data from the appropriate one of the read data cache and the write data cache.

The read data cache can respond to a forwarded read request by returning target data that it is already stored in the read data cache or fetching any portions of the target data not already stored within the read data cache from the memory.

The coherency circuitry can conveniently utilise a hit mask to represent which portions of the read-target data correspond to write data currently stored within the write data cache and which portions do not correspond to any write data currently stored within the write data cache.

The coherency logic can manage data hazards of various types in different ways. In some embodiments a write access corresponding to a temporarily proceeding, but not yet completed read access, will result in at least that overlapping portion of the write access being prevented until the read access has completed.

In the context of write-after-write hazards it may be that certain systems and interconnect protocols may not have strict requirements concerning the expected results when such hazards arise. As an example, the AXI-based interconnects previously mentioned do not necessarily require any particular one of a sequence of write data to be returned when such a write-after-write hazards arises. However, in other protocols there may be restrictions and accordingly the coherency circuitry can respond by either, for example, preventing writing of a subsequent write access to the write data cache until the overlapping portion of a preceding write access has completed or stalling the subsequent write request in its entirety until after the preceding write request has completed.

The decoupling of the system side and the memory side of the memory controller is assisted by the use of valid bits being set to indicate when read cache lines contain valid data fetched from the memory. In this way, the fetching of data from the memory is decoupled from the operation of the system side and yet the system side, is able to respond when valid data has been appropriately fetched.

The write data cache and the read data cache have multiple interfaces such that they receive access requests from circuits operating in the system clock domain and access the memory with operations in a memory clock domain.

The use of read cache lines and write cache lines is managed by the coherency circuitry. Read cache lines can be marked as available for reuse when there are no pending access requests dependent upon those read cache lines. In a similar way, write cache lines may be marked as available for use when the write data within them has been written to the memory and there are no pending access requests dependent upon the write cache line concerned.

The memory controller can buffer write requests and improve throughput by returning a completed response to write requesting circuitry when the write data is stored within the write data cache and before the write data is actually written to the memory.

In association with the memory controller there may be provided prefetch circuitry which is responsive to access requests received by the memory controller to predict future read requests and to issue corresponding prefetch read requests to the read data cache. Observed behaviour in this way is used to predict future behaviour and spare resource, if any, within the memory controller can be used to prefetch data in a manner seeking to improve overall performance.

It will be appreciated that the memory controller effectively buffers access requests which may be both write accesses and read accesses. It may also buffer prefetch accesses and refresh commands associated with certain memories and certain systems. In order to more effectively control such a system, it is possible to provide scheduling circuitry which is responsive to scheduling data associated with the various pending requests in order to schedule the requests to be performed upon the memory. The scheduling data can take a variety of different forms including a priority level associated with a request and/or a maximum latency associated with a request.

It will be appreciated that with some forms of memory it is necessary to periodically refresh the memory in order to avoid data lose and this function can be performed by the memory controller using refresh circuitry which inserts refresh commands among the stream of access requests sent to the memory.

Viewed from another aspect the technology described herein provides a memory controller comprising:
  write data cache means having a plurality of write cache line means respectively for storing write data to be written to a memory;
  read data cache means separate from said write data cache means and having a plurality of read cache line means respectively for storing read data read from said memory; and
  means for managing coherency coupled to said write data cache means and said read data cache means and responsive to access requests to said memory to manage coherency between said write data, said read data and data stored within said memory.

Viewed from a further aspect the technology described herein provides a method of controlling a memory, said method comprising the steps of:
  storing write data to be written to a memory in respective write cache lines of a write data cache;
  storing read data read from said memory in respective read data lines of a read data cache, said read data cache being separate from said write data cache; and
  managing coherency between said write data, said read data and data stored within said memory.

The above, and other objects, features and advantages will be apparent from the following detailed description of illustrative embodiments which is to be read in connection with the accompanying drawings.

DETAILED DESCRIPTION

Figure 1:
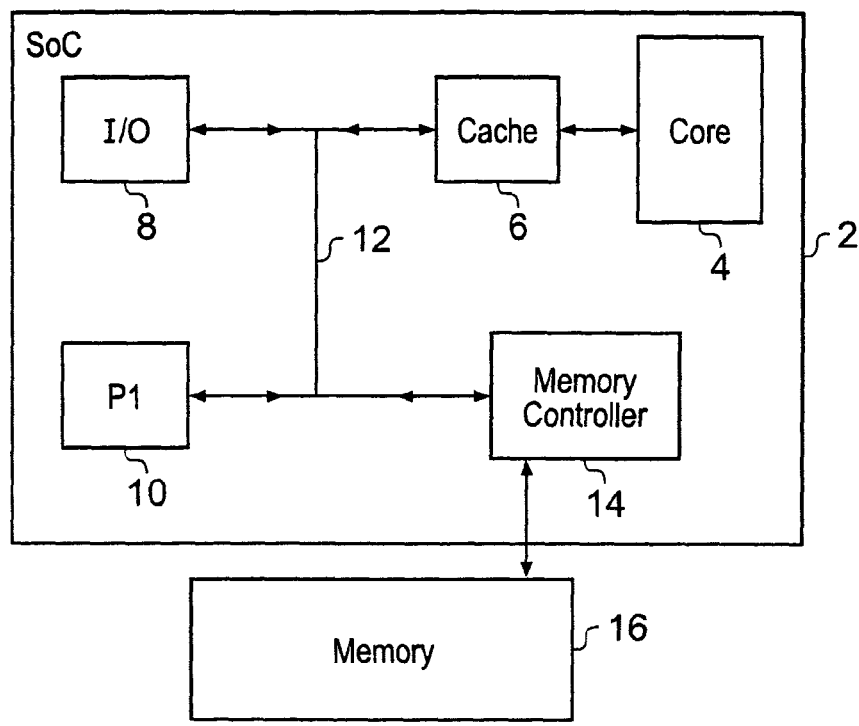
FIG. 1 schematically illustrates a system-on-chip integrated circuit connected to a memory.

FIG. 1 illustrates a system-on-chip integrated circuit 2 including a processor core 4, a processor cache memory 6, an input/output functional block 8, a peripheral 10 and a memory controller 14 all connected via an interconnect 12. This interconnect 12 may have the form of an AXI interconnect as previously discussed or may have a different form. The memory controller 14 provides access to an off-chip memory 16, which may have the form of a DRAM, SRAM or other form of memory.

In operation, the memory controller 14 receives memory access requests, being either read access requests or write access requests, from the various other functional units 4, 6, 8, 10 attached to the interconnect 12. The memory controller 14 also serves to generate appropriate refresh signals that drive the memory 16 as well as performing prefetching operations as will be discussed later. It will be appreciated that the memory controller 14 may be programmable, so as to be able to cope with a variety of different forms of the memory 16, such as providing configurability to deal varying memory bus widths, timing requirements and the like.

Figure 2:
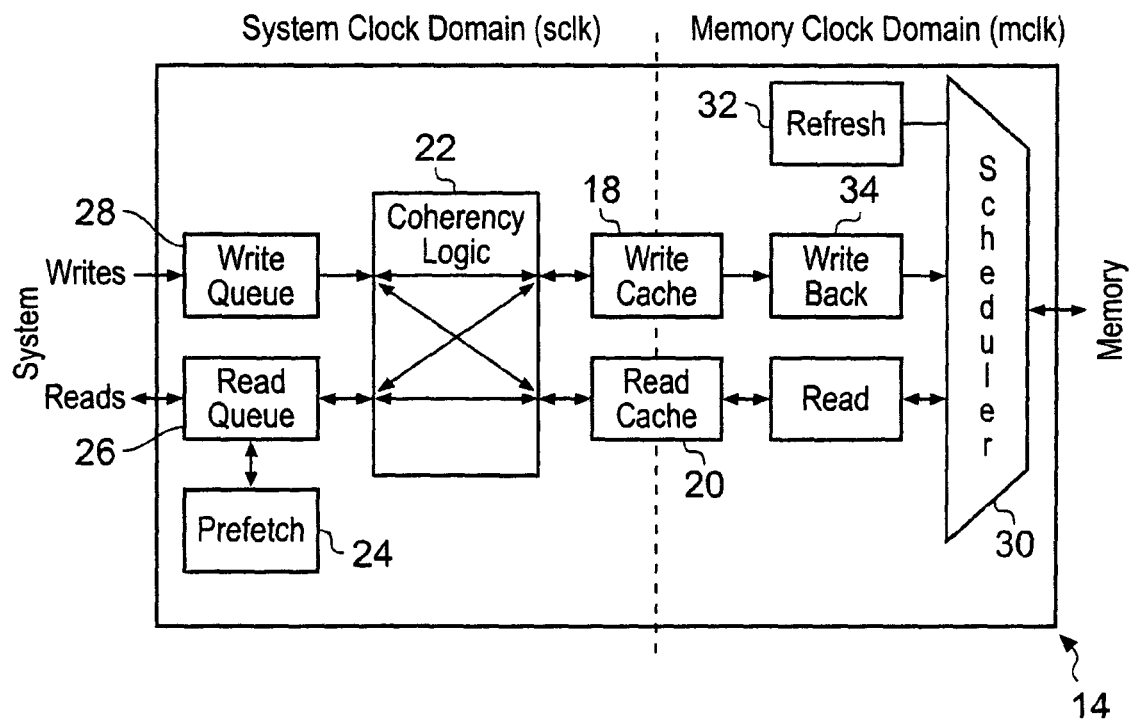
FIG. 2 schematically illustrates a memory controller including a write data cache, a read data cache and coherency circuitry.

FIG. 2 schematically illustrates the memory controller 14 in more detail. The memory controller 14 includes a write data cache 18, a read data cache 20 and coherency circuitry 22. As illustrated, one portion of the memory controller 14 operates in the memory clock domain (mclk) whist another portion operates in the system clock domain (sclk). Also included within the memory controller 14 are prefetch circuitry 24 which is responsive to, in this example embodiment, observed read requests received in a read queue 26, to predict future read accesses and to generate prefetch read requests.

Write requests from the interconnect 12 are received into a write queue 28. The coherency circuitry 22 serves to manage coherency between the write data within the write data cache 18, the read data within the read data cache 20 and the data within the memory 16 so as to service the read request received in the read queue 26 and the write request received in the write queue 28 in their proper temporal order.

The write data cache 18 and the read data cache 20 straddle the system and memory clock domains (sclk/mclk). The write data cache is written to from the system domain and the read data cache is written to from the memory domain. Flag bits within the write data cache 18 and the read data cache 20 indicating validity of the data within respective write cache lines and read cache lines are used to synchronise between the two domains. As an example, the valid bit can be used to indicate when a read cache entry is valid such that the system domain can then take the read data from that read cache line. This use of flags reduces the amount of synchronisation logic required between the two domains.

Memory access coherency for reads is managed by recording at the time each read request is received what is to be used as the source for the data to supply different portions of that read request, i.e. whether certain portions are to be read from the write data cache 18 as they correspond to pending write data, are to be read from the read data cache 20 as they correspond to data already cached in the read data cache 20 or data to be fetched to the read data cache 20 from the memory 16. A "hit mask" is used to represent this source specifying information associated with each read request. Different bits with the hitmask correspond to different portions of the data read request and the bit value indicates which source will be used.

Providing there is sufficient space within the write data cache 18, write access requests can be written into the write data cache 18 as soon as they are received and a completed response returned to the write requesting circuitry via the interconnect 12. This reduces the latency of writes. The latency of reads is not adversely affected since the coherency circuitry 22 is able to identify the correct data within pending write data held within the write data cache 18 and supply this if required as part of a response to a read request.

When pending write requests held within the write data cache 18 are to be issued by scheduling circuitry 30, a check is made by the scheduling circuitry 30 as to whether there are any temporarily preceding read requests that require the old data within the memory 16 before that old data is overwritten. If there are such preceding read requests, then the write request is inhibited until the hazard has cleared. A write-after-write hazard can be dealt with in a number of ways depending upon the requirements of the protocol concerned. Some protocols may have no particular requirement as to how such a hazard is handled, if at all. However, if necessary, then a subsequent write access can be stalled when a preceding write access to the same portion of memory is noted as not yet having been completed. Such a stalled write access will not be added to the write data cache 18 until the hazard has cleared. As an alternative, it would be possible to add the subsequent write request to the write data cache 18 and perform the appropriate control to ensure that the subsequent write access to memory 16 is not performed until the at least partially overlapping preceding access to memory has been made.

It will be appreciated that the identification of overlapping access, both within the same access type and between access types, can conveniently be achieved by comparing TAG values associated with the memory accesses concerned. The write data cache 18 and the read data cache 20 can associate such TAG values with write cache lines and read cache line within their respective structures.

Read cache lines are made available for reuse when there are no outstanding commands dependent thereupon. Write cache lines become free for reuse if there are no outstanding commands dependent thereon and the data has actually been written back to memory. If prefetching is being used, then an additional flag within the read cache lines of the read data cache 20 can be used to mark such prefetched data such that prefetched data can be preferentially evicted should the cache become full as its presence is merely speculative. The cache line sizes can be chosen to match the wider of the system bus or the memory bus as appropriate.

Figure 3:
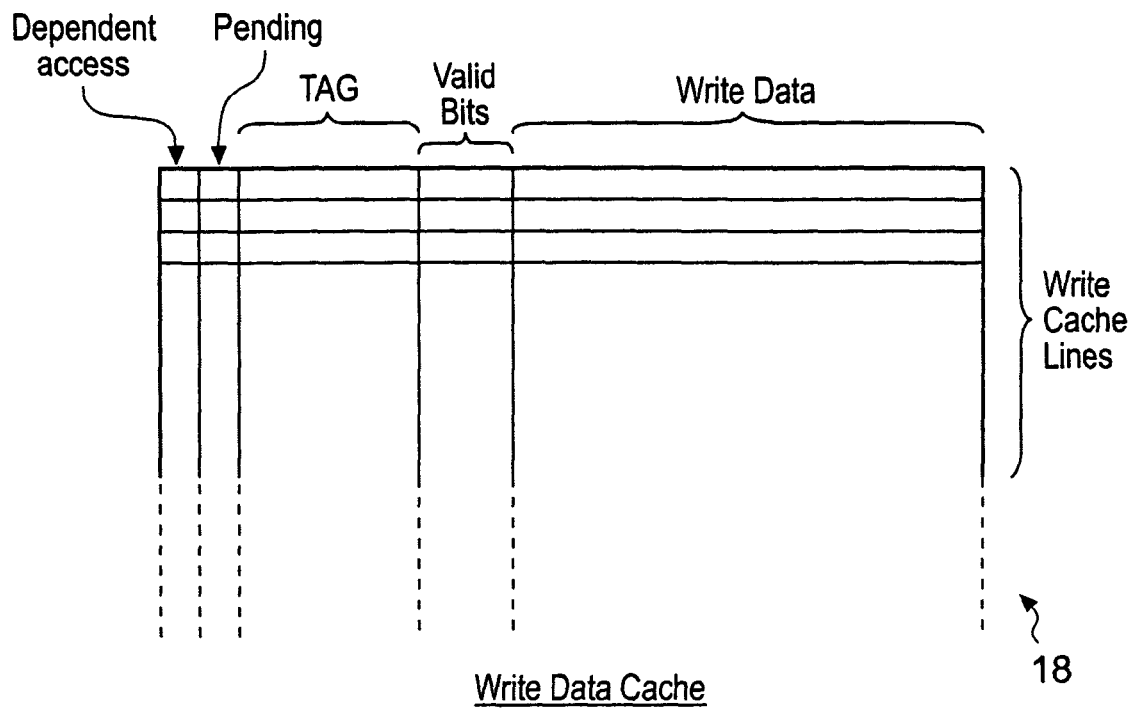
FIG. 3 schematically illustrates a write data cache.

FIG. 3 schematically illustrates the write data cache 18 as formed of multiple write cache lines, each including write data values to be written to the memory 16, valid bits indicating the validity or otherwise of the write data values, a TAG field indicating the memory address associated with that write cache line and flag bits indicating whether the write concerned is still pending and whether there are any dependent accesses that have been identified by the coherency circuitry 22 as dependent upon the write access of that write cache line.

Figure 4:
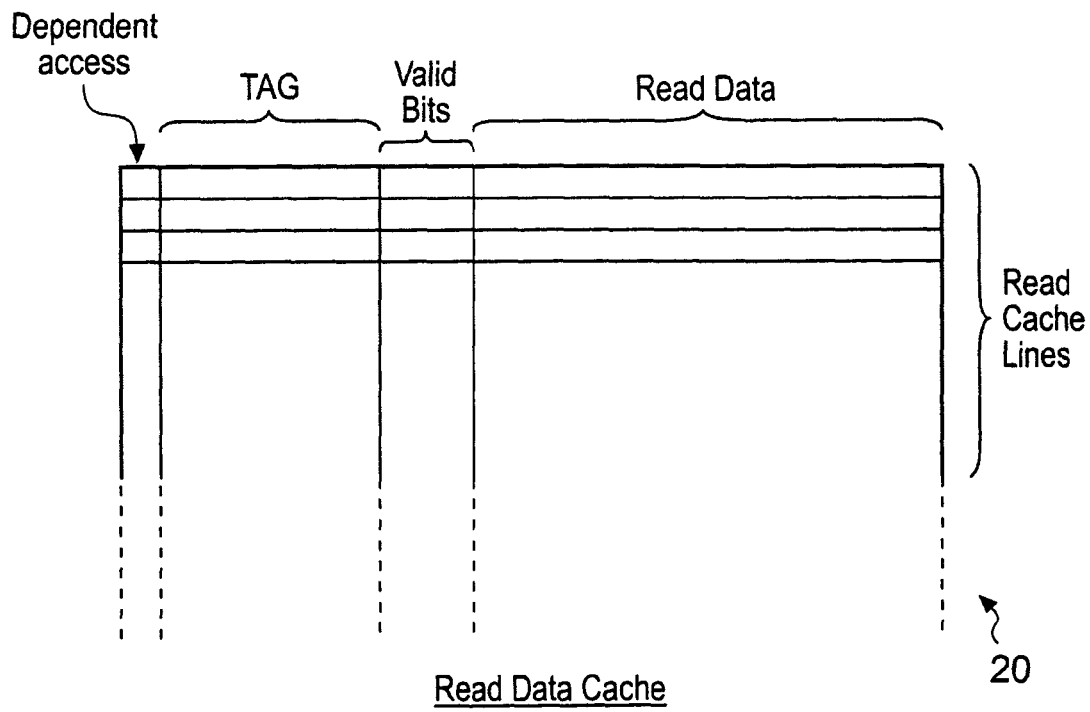
FIG. 4 schematically illustrates a read data cache.

FIG. 4 similarly illustrates a read data cache 20 formed of multiple read cache lines. Each read cache line comprises read data, valid bits, a TAG field and a flag indicating whether there are dependent accesses.

It will be appreciated that FIGS. 3 and 4 illustrate only one example embodiment of the information which can be stored within or associated with the respective write cache lines and read cache lines and that alternative and/or additional data may be stored therein as well as some of the data being omitted where appropriate.

The processes performed in the system domain and the memory domain can be separately considered. These are explained below in the case of one example embodiment:

System Processes

1. Write

Write requests are queued and allocated cache lines in order (or in order per ID in the case of AXI interconnect IDs). Write data is written to the allocated cache lines. Write data can be accepted at the system clock rate until the write data cache 18 is full or there is a write-after-write clash.

The write request is looked up in the read data cache 20. This is used by the coherency circuitry 22 to mark the write cache entries to inhibit write-back until any earlier read accesses have been satisfied.

2. Read

Read requests are queued and processed in order (or in order per ID in the case of AXI interconnect IDs).

The read request is looked up in the write data cache 18. This generates a "hit mask" showing which data items, if any, are to be fetched from the write data cache 18 in preference to the read data cache 20. Any data items that are not in the write data cache 18 are forwarded as memory read requests.

The read data responses are made either from the write data cache 18 or from the read data cache 20 as the entries become valid. The hit mask which was formed when the read request was received ensures that a read request will only see write data from write requests that are to be treated as having completed at the time the read request was made. The rare case of a write-after-write clash is stalled.

3. Prefetch

The prefetch circuitry 24 monitors the incoming read requests and attempts to predict future requests. These are allocated in the read data cache 20 and reduce latency if the prediction is accurate.

Memory Processes

1. Write-Back

This continuously monitors the write data cache 18 looking for data that needs to be written to the memory 16. It can concatenate writes and re-order the writes so as to make better use of the memory interface. The write-back process does not need to check for coherency problems due to re-ordering as these constraints are handled on the system side of the controller.

2. Read

The read process continuously monitors the read data cache 20 for data to read from the memory 16. The read process can amalgamate reads and re-order accesses to make better use of the memory interface. The read process does not need to check for coherency problems due to re-ordering as all these constraints are handled on the system side of the controller.

The read process can be steered by a request queue to bias the order towards the original request order. Alternatively, only requests within a certain time of their maximum latency requirement would be queued and therefore given priority.

3. Refresh

Some memory types require regular refresh commands. Refresh circuitry 32 within the memory controller 14 generates these commands at the required rate (which can be programmed).

4. Scheduler

A scheduler 30 within the memory controller 14 arbitrates between the processes to choose commands to send to the memory 16.

Figure 5:
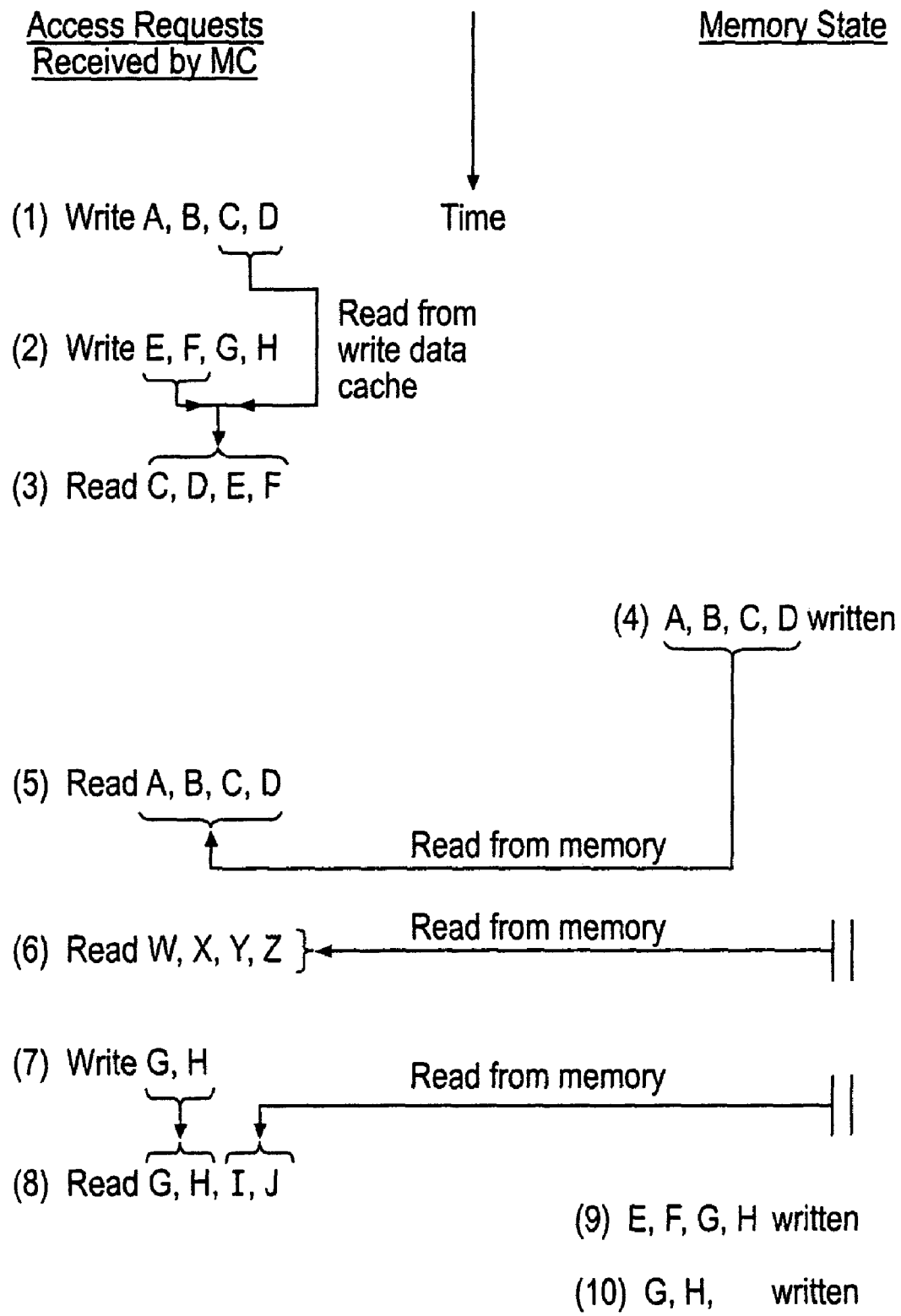
FIG. 5 schematically illustrates a sequence of memory access requests received by a memory controller in combination with changes in memory state that result therefrom.

FIG. 5 is a diagram schematically illustrating the relationship between access requests received by the memory controller 14 and the actual state of the memory 16 at different points in time.

At time (1) a write request to addresses A, B, C and D is received by the memory controller 14. At time (2) a write access request to addresses E, F, G and H is received by the memory controller 14. At time (3) a read request to addresses C, D, E and F is received by the memory controller. At time (3) neither of the write requests received at time (1) and (2) has yet been made in the memory 16. Nevertheless, the coherency circuitry 22 identifies that the pending writes have corresponding write cache lines within the write data cache 18 where the data for the addresses C, D, E and F is stored. Accordingly, the read request time (3) can be serviced by data values read from the write data cache 18 as is shown in FIG. 5.

Subsequent to the read operation at time (3), a change in memory state occurs within the memory 16 at time (4) in response to the original write request at time (1). This change of state is to write the data values into addresses A, B, C and D of the memory 16. At time (5) a read request is made to addresses A, B, C and D. As the write request at time (1) has been completed its entry will have been purged from the write data cache 18 and accordingly the data values for addresses A, B, C and D are no longer present within the write data cache 18. The data value for addresses A and B are fetched from the memory 16. The read of C and D at time (3) does not copy data from the write data cache to the read data cache and so C and D will also be fetched from memory.

At time (6), a read request to previously unaccessed (at least within a time that the data will be present within the write data cache 18 or the read data cache 20) memory addresses W, X, Y and Z is received and as none of this data is within either the write data cache 18 or the read data cache 20 it is recovered from the main memory 16.

At time (7), a write access to addresses G, and H is received. The write access at time (2) has still not yet been performed. At time (8), a read request is received for addresses G, H, I and J. The coherency circuitry 22 determines that the most recent write access to the addresses G and H as being the one at time (7) and recovers this read data from the relevant write cache line within the write data cache 18 for the write access at time (7) with the remaining data for addresses I and J being read from the main memory since it has not yet been accessed and is not present within either of the caches 18, 20.

At times (9) and (10), the writes corresponding to times (2) and (7) are performed. It will be appreciated that the write back circuitry 34 of FIG. 2 can concatenate (amalgamate) these writes if desired in order to eliminate the redundancy of writing the addresses G and H twice.

Considering the read operation corresponding to time (3), it will be seen that this is serviced by data drawn from buffered write accesses at times (1) and (2). These two write cache lines correspond to two different desired states of the memory 16, namely states corresponding to the result of each of their respective writes. The read access at time (3) is able to draw from the data for both of these states as both are represented by the state held within the write data cache 18.

There are three main ways to satisfy a read depending upon the content of the write data cache 18:

a) all from the write data cache 18;
b) all from the read data cache 20—it will be appreciated that data fetched from memory 16 will be cached within the read data cache 20 and supplied from the read data cache 20 on the first and subsequent reads; and
c) from a combination of the read data cache 20 and the write data cache 18.

There are two subclasses of situations b) and c) above. These are when the read data cache 20 misses all or part of the data. In these cases the missing data will be fetched from memory placed in the read data cache 20 and supplied to satisfy the read. The examples of FIG. 5 show misses in the read data cache 20 and the data being fetched from memory. If the reads hit in the read data cache 20 either fully or partially, then those items of data can be supplied from the read data cache 20 in a way similar to a normal cache memory.

Figure 6:
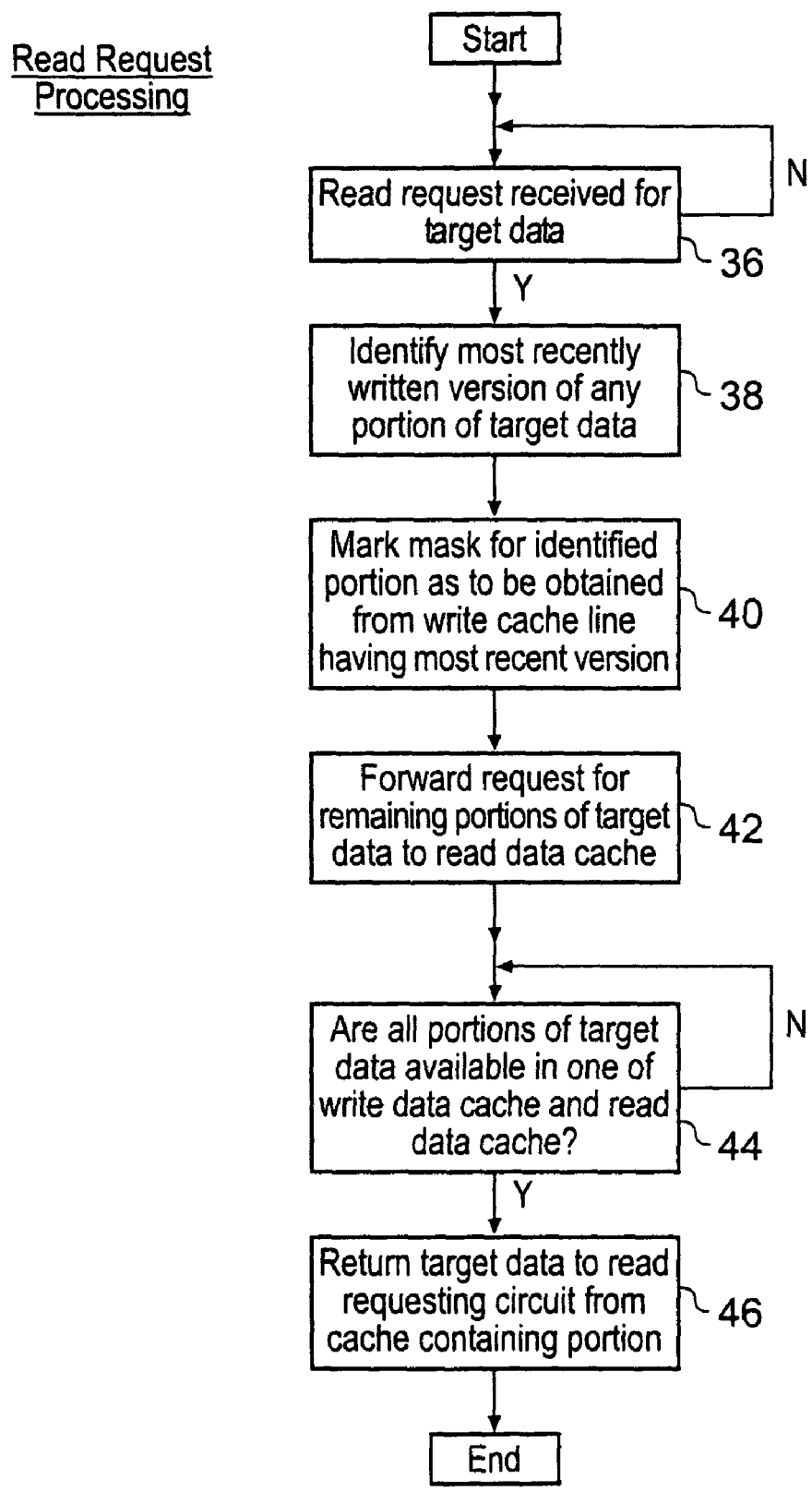
FIG. 6 is a flow diagram schematically illustrating how the coherency circuitry of FIG. 2 may operate to process a received read request.

FIG. 6 is a flow diagram schematically illustrating how the coherency circuitry 22 processes a read request. At step 36, the processing waits until a read request is received. At step 38, the most recently written version of any portion of the target data being sought is identified within the write data cache 18. It will be appreciated that no such data may be identified or multiple such portions of data may be identified. The portions of data may be disjoint. The hit mask bits used to represent which portions of read data are to be recovered from the write data cache 18 and which are to be supplied by the read data cache 20 can be used to identify the source. These mask bits are set at step 40. Step 42 forwards a read request for the remaining portions of the target data which are not present within the write data cache 18. This forwarded read request is sent to the read data cache 20. The read data cache 20 processes this forwarded read request as will be discussed in relation to FIG. 7. The processing performed by the coherency circuitry 22 waits at step 44 until all portions of the target data are indicated by their associated valid bits within the write data cache 18 and the read data cache 20 as being present in appropriate read cache lines and write cache lines. When this data is all present, step 46 returns the target data to the read requesting circuitry from the appropriate one of the caches 18, 20 containing that portion of data.

Figure 7:
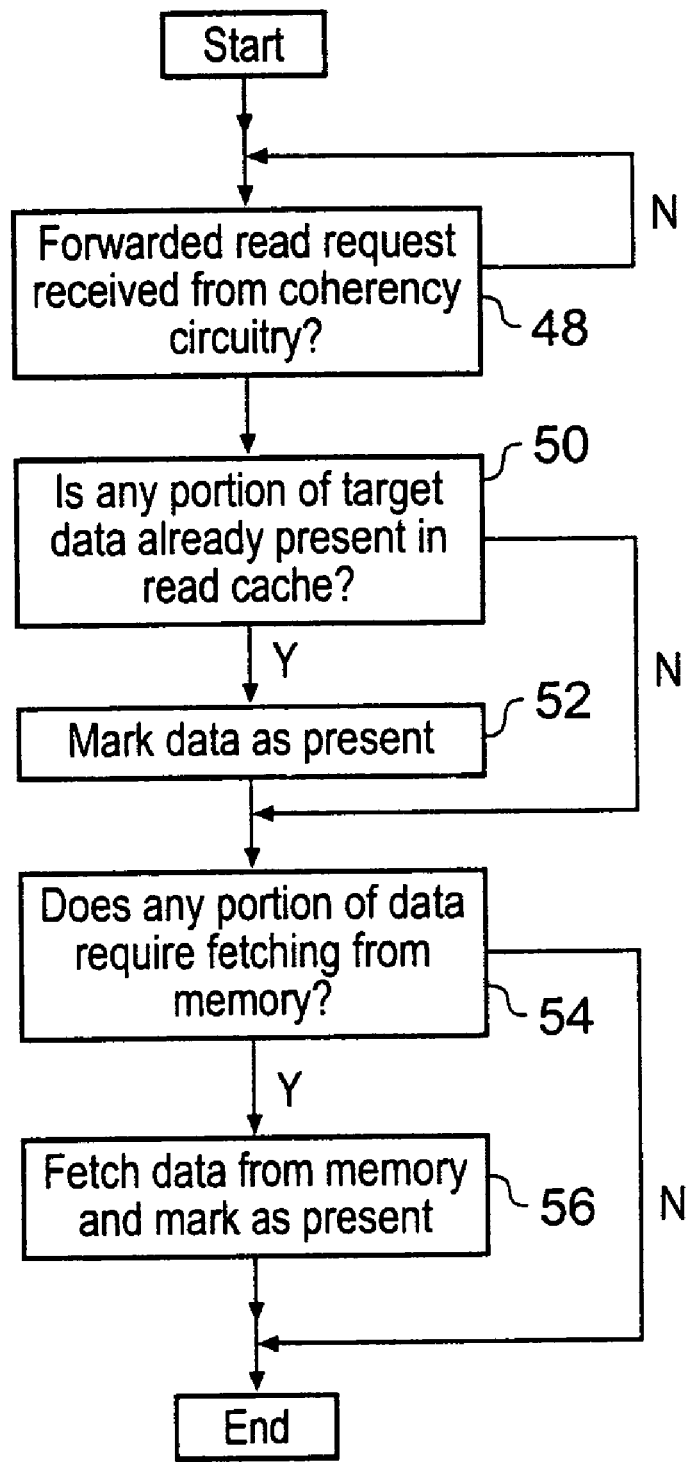
FIG. 7 is a flow diagram schematically illustrating how the read data cache of FIG. 2 may operate to service a read request received from coherency logic.

FIG. 7 is a flow diagram schematically illustrating how the read data cache 20 responds to a forwarded read request. At step 48, the processing waits until a forwarded read request is received. At step 50, a determination is made as to whether any portion of the target data within that forwarded read request is already present within the read cache. If such data is present, then this will be indicated by the associated valid bits within a read cache line having a matching TAG identified at step 50 and marking noted at step 52. Step 54 determines whether there are any remaining portions of the target data which require fetching from the memory 16. If there are any such remaining portions, then step 56 fetches them from memory 16 before processing terminates.

Figure 8:
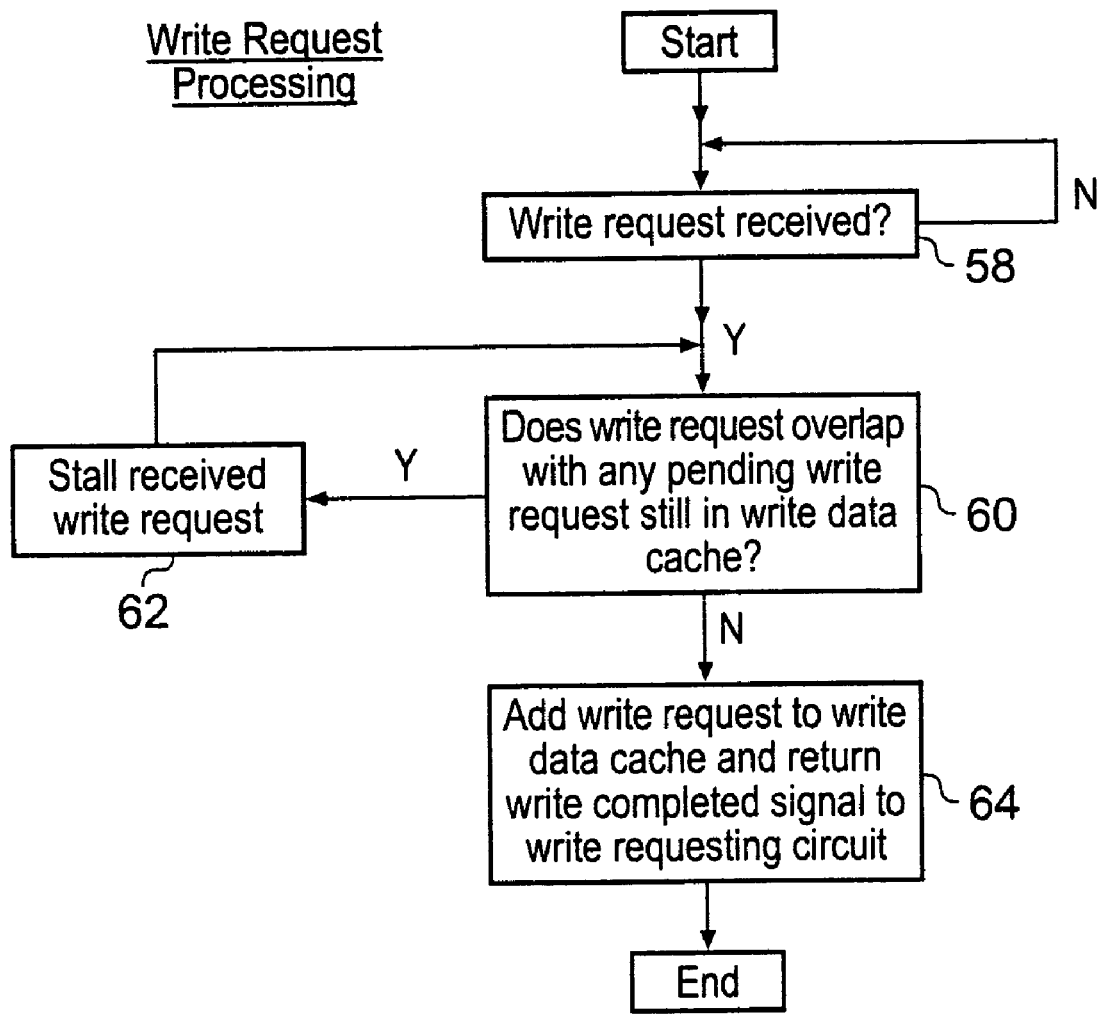
FIG. 8 is a flow diagram schematically illustrating how the coherency logic of FIG. 2 may process a received write request.

FIG. 8 is a flow diagram schematically illustrating how a write request may be processed by the coherency circuitry 22. At step 58, processing waits until a write request is received. At step 60, a determination is made as to whether the write request overlaps with any pending write requests still in the write data cache 18. If there is such an overlap, then step 62 stalls the received write request until the overlap is no longer present (i.e. the preceding overlapping write request has been performed and removed from the write data cache 18). It will be appreciated that stalling the received write request at step 62 is only one option and some systems may not have a requirement to deal with write-after-write hazards. An alternative way of dealing with such hazards, if necessary, is to allow the subsequently received write request to enter the write data cache 18, and use the coherency circuitry to ensure that it is not processed until the preceding write request has been processed. When step 60 identifies that there is no write-after-write hazard, then processing proceeds to step 64 at which the received write request is added to the write data cache 18 and a write completed signal returned to write access requesting circuitry via the interconnect 12.

Figure 9:
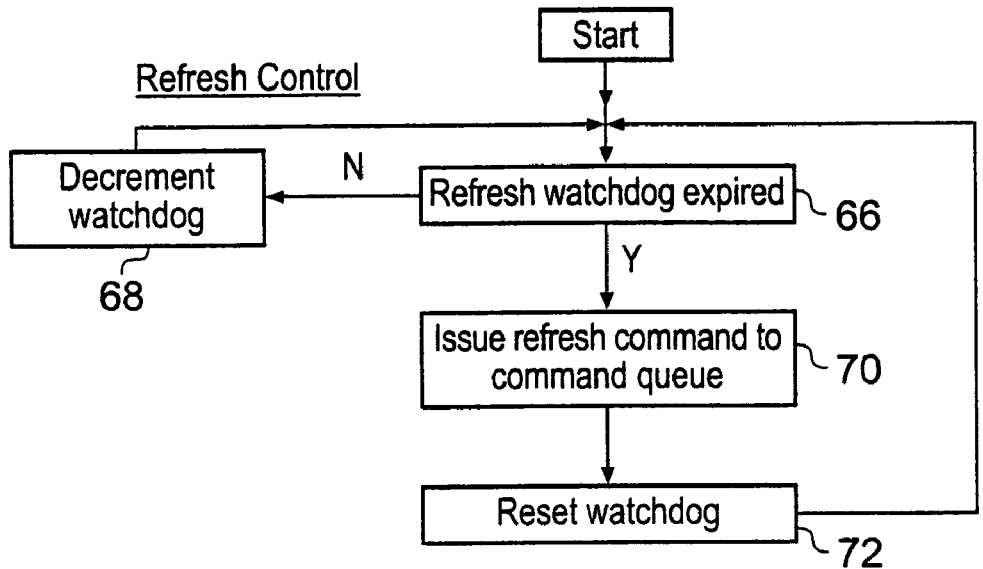
FIG. 9 is a flow diagram illustrating how memory refresh control may be performed.

FIG. 9 schematically illustrates a flow diagram of how refresh control is performed by the refresh circuitry 32. Step 66 determines whether a watchdog timing has expired. If the timer has not expired, then the timer is decremented at step 68. When the timer has expired, then step 70 issues a refresh command into a command queue where it will be scheduled by the scheduling circuitry 30 in combination with write access requests, read access requests and prefetch read access requests. Step 72 resets the watchdog timer before returning processing to step 66.

Figure 10:
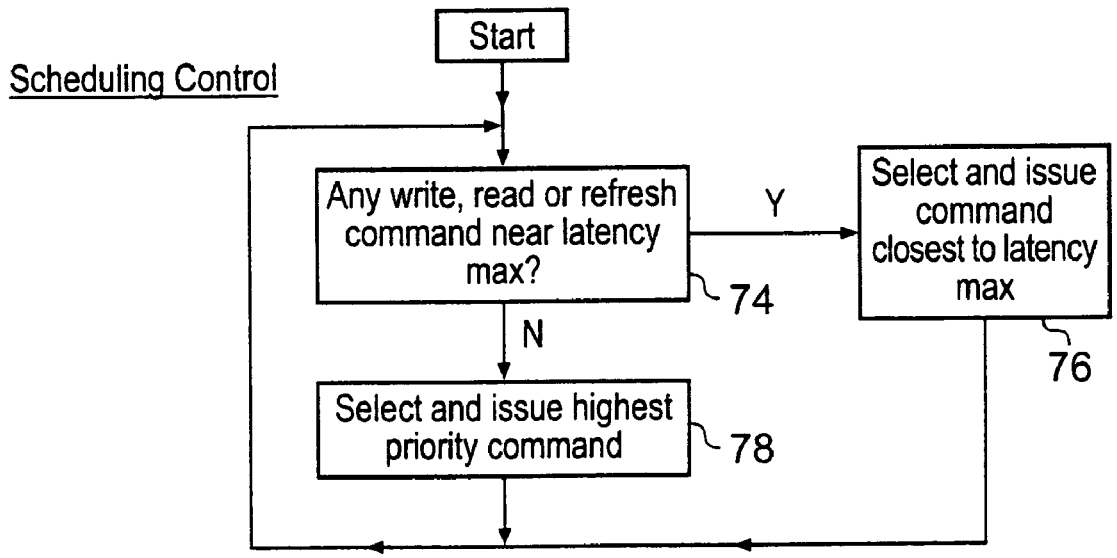
FIG. 10 is a flow diagram schematically illustrating how scheduling control may be performed.

FIG. 10 is a flow diagram illustrating how the scheduling circuitry 30 may schedules commands issued to the memory 16. At step 74, the scheduling circuitry 30 determines whether any pending write, read or refresh commands are nearing their specified latency maximum. If there are any such commands, then step 76 serves to select the one closest to its latency maximum for issue (with refresh being given most priority). If there are no such commands nearing their latency maximum, then step 78 selects the command having the associated highest priority value. It will be appreciated that latency maximum data and priority value data are forms of scheduling data which can be associated with the different commands. The commands can correspond to data held or to be held in write cache lines within the write data cache 18, pending read requests as noted within a read queue 26 and by the coherency circuitry 22, refresh commands as issued by the refresh circuitry 22 and prefetch read access requests as issued into the read queue 26 by the prefetch circuitry 24. There are alternative possibilities for this scheduling data which can be used in addition to or instead of the maximum latency value and priority value suggested above.

Figure 11:
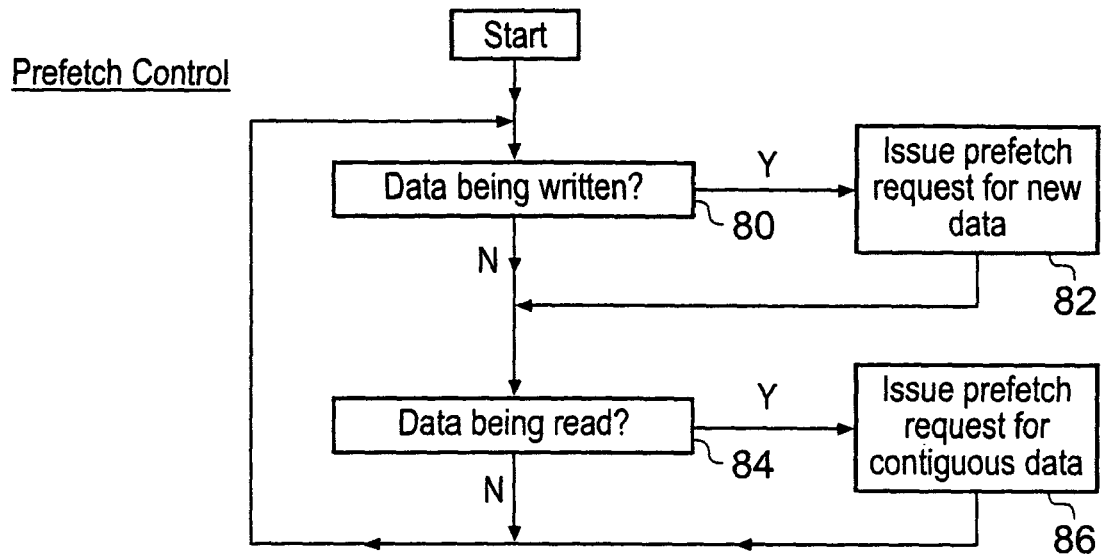
FIG. 11 is a flow diagram schematically illustrating how prefetch control may be performed.

FIG. 11 is a flow diagram schematically illustrating prefetch control. At step 80, the prefetch circuitry 24 determines whether any data is being written. If data is being written, then step 82 issues a prefetch request corresponding to that data being written. It is statistically likely that if data is active in the sense that it is being written, then it is probable that it soon will be read. Step 84 determines whether any data values are being read. When such data values are being read, then step 86 issues a prefetch request for contiguous data. It is statistically likely that if one data value is being read, then adjacent data values soon will be read.

Figure 12:
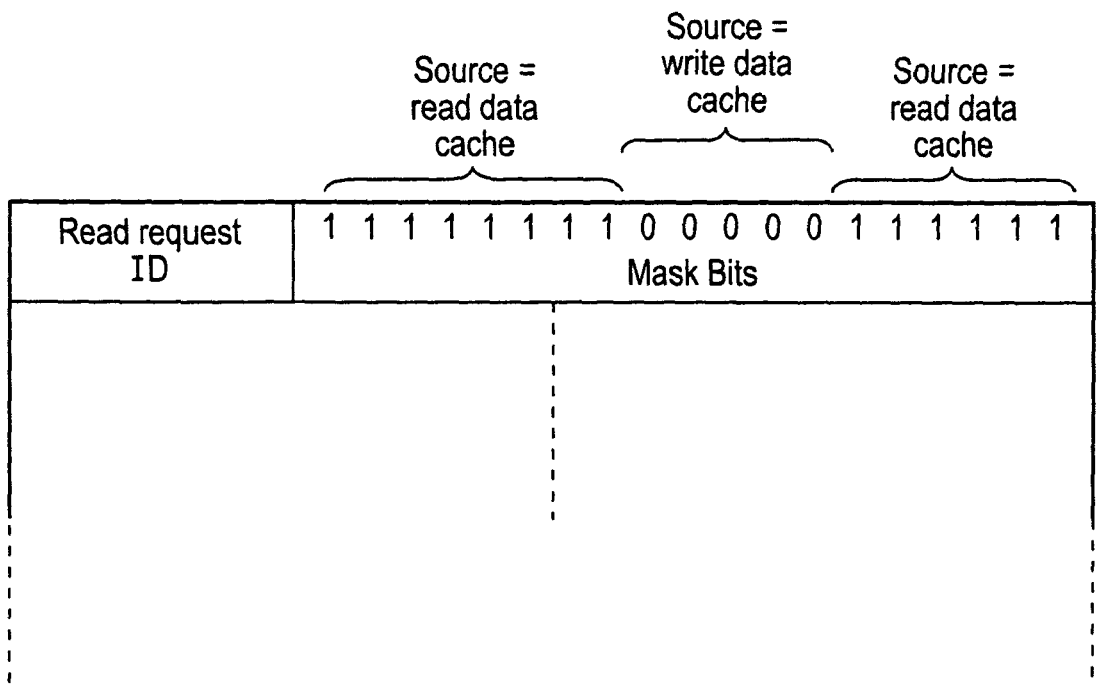
FIG. 12 schematically illustrates how mask bits may be used to select the source of read-target data associated with a read request being controlled by the coherency circuitry of FIG. 2.

FIG. 12 illustrates a hit mask associated with a read request. This hit mask includes a read request identifier, such that the read request within the read queue 26 can be identified and associated with the determination made by the coherency circuitry 22 as to what source is to be used for the different portions of the target-read data. As illustrated in FIG. 12, different bit values are used to indicate that either the read data cache 20 or the write data cache 18 are to be used as the source for respective portions of the target-read data.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the claims.

I claim:

1. A memory controller comprising:
a write data cache having a plurality of write cache lines respectively storing write data to be written to a memory;
a read data cache separate from said write data cache and having a plurality of read cache lines respectively storing read data read from said memory; and
coherency circuitry coupled to said write data cache and said read data cache and responsive to access requests to said memory to manage coherency between said write data, said read data and data stored within said memory, wherein said coherency circuitry is responsive to an ordering in time of a plurality of write access requests corresponding to respective write cache lines and a received read access request for read-target data to control return of said read-target data to include corresponding portions of write data stored within said write data cache and temporally preceding said read access request and not to include any corresponding portions of write data stored within said write data cache and temporally succeeding said read access request, and to control return of any other portions of said read-target data from one or more of said read data cache and said memory.

2. A memory controller as claimed in claim 1, wherein said plurality of write cache lines of write data within said write data cache correspond to a plurality of different states of said memory and said coherency circuitry is configured to manage coherency between said data access requests and said plurality of different states of said memory.

3. A memory controller as claimed in claim 1, wherein said coherency circuitry is responsive to a read request from a read requesting circuit for read-target data from said memory:
   (i) to identify any portion of said read-target data corresponding to write data currently stored within said write data cache;
   (ii) to forward a forwarded read request to said read data cache in respect any portion said read-target data not corresponding to write data currently stored within said write data cache; and
   (iii) to control return of respective portions of said read-target data to said read requesting circuit from said write data cache and said read data cache.

4. A memory controller as claimed in claim 3, wherein said read data cache is responsive to said forwarded read request:
   (i) to return any portions of said read-target data stored within said read data cache from said read data cache; and
   (ii) to fetch any portions of said read-target data not stored within said read data cache from said memory.

5. A memory controller as claimed in claim 3, wherein said coherency circuitry is configured to use a hit mask to represent which portions of said read-target data correspond to write data currently stored within said write data cache and which portions of said read-target data do not correspond to write data currently stored within said write data cache.

6. A memory controller as claimed in claim 1, wherein said coherency circuitry is responsive to a write request to write-target data to said memory:
   (i) to identify any portion of said write-target data corresponding to read-target data of a temporally preceding and not yet completed read request; and
   (ii) to prevent writing of at least said portion of said write-target data to said write data cache until after said read request has completed.

7. A memory controller as claimed in claim 1, wherein said coherency circuitry is responsive to a write request to write-target data to said memory:
   (i) to identify any portion of said write-target data corresponding to write-target data of a temporally preceding and not yet completed write request; and
   (ii) to prevent writing of at least said portion of said write-target data to said write data cache until after said temporally preceding write request has completed.

8. A memory controller as claimed in claim 1, wherein said coherency circuitry is responsive to a write request to write-target data to said memory:
   (i) to identify any portion of said write-target data corresponding to write-target data of a temporally preceding and not yet completed write request; and
   (ii) to stall said write request until after said temporally preceding write request has completed.

9. A memory controller as claimed in claim 1, wherein said read cache has valid bits indicative of when associated said read cache lines contain valid data fetched from said memory.

10. A memory controller as claimed in claim 1, wherein said write data cache and said read data cache are configured to receive said access requests from circuits operating in a system clock domain and access said memory with operations in a memory clock domain, said memory clock domain being distinct from said system clock domain.

11. A memory controller as claimed in claim 1, wherein said coherency circuitry is configured to mark a read cache line as available for reuse when no pending access requests depend upon said read cache line.

12. A memory controller as claimed claim 1, wherein said coherency circuitry is configured to mark a write cache line as available for reuse when write data within said write cache line has been written to said memory and no pending access requests depend upon said write cache line.

13. A memory controller as claimed in claim 1, wherein said memory controller is configured to return an access completed response to a write requesting circuit when said write data is stored within said write data cache and before said write data is written to said memory.

14. A memory controller as claimed in claim 1, comprising prefetch circuitry responsive to access requests received by said memory controller to predict future read requests and to issue corresponding prefetch read requests to prefetch read data to said read data cache.

15. A memory controller as claimed in claim 1, comprising scheduling circuitry responsive to scheduling data associated with pending write requests corresponding to write data within said write data cache and with pending read requests corresponding to read data to be fetched to said read data cache to schedule access requests to said memory.

16. A memory as claimed in claim 15, wherein said scheduling data includes at least one of:
   (i) a priority level of an access request; and
   (ii) a maximum latency of an access request.

17. A memory controller as claimed in claim 1, comprising refresh circuitry coupled to said memory to insert refresh commands among a stream of access requests sent to said memory.

18. A memory controller comprising:
   write data cache means having a plurality of write cache line means respectively for storing write data to be written to a memory;
   read data cache means separate from said write data cache means and having a plurality of read cache line means respectively for storing read data read from said memory; and
   means for managing coherency coupled to said write data cache means and said read data cache means and responsive to access requests to said memory to manage coherency between said write data, said read data and data stored within said memory,
   wherein said means for managing coherency is responsive to an ordering in time of a plurality of write access requests corresponding to respective write cache lines and a received read access request for read-target data to control return of said read-target data to include corresponding portions of write data stored within said write data cache and temporally preceding said read access request and not to include any corresponding portions of write data stored within said write data cache and temporally succeeding said read access request, and to control return of any other portions of said read-target data from one or more of said read data cache means and said memory.

19. A method of controlling a memory, said method comprising the steps of:
   storing write data to be written to a memory in respective write cache lines of a write data cache;
   storing read data read from said memory in respective read data lines of a read data cache, said read data cache being separate from said write data cache; and
   managing coherency between said write data, said read data, and data stored within said memory responsive to an ordering in time of a plurality of write access requests corresponding to respective write cache lines and a received read access request for read-target data to control return of said read-target data to include corresponding portions of write data stored within said write data cache and temporally preceding said read access request and not to include any corresponding portions of write data stored within said write data cache and temporally succeeding said read access request, and to control return of any other portions of said read-target data from one or more of said read data cache and said memory.

* * * * *